Patented May 23, 1950

2,508,990

UNITED STATES PATENT OFFICE 2,508,990

PRODUCTION OF β-(ACENAPHTHOYL) ACRYLIC ACIDS

Robert R. Burtner, Skokie, Ill., assignor to G. D. Searle & Co., Skokie, Ill., a corporation of Illinois No Drawing. Application February 4, 1948, Serial No. 6,339

6 Claims. (Cl. 260—515)

This invention relates to processes for producing β-(acenaphthoyl) acrylic acids. In particular it relates to the production of β-(acenaphthoyl) acrylic acids by the dehydrohalogenation of the corresponding β-halo-β-(acenaphthoyl)-propionic acids.

β-(acenaphthoyl) acrylic acid has been prepared in poor yield by condensing acenaphthene with maleic anhydride (Fieser & Peters, J. A. C. S. 54:4355, 1932). This process is extremely inefficient to carry out on a commercial scale, and is consequently highly expensive. I have discovered that β-(acenaphthoyl) acrylic acids can be prepared in good yield, and with relatively simple equipment and few manipulative steps, by halogenating a β-(acenaphthoyl) propionic acid, and subjecting the resulting halogenated acid to treatment with mildly alkaline agents to split out the elements of hydrogen halide and form a β-(acenaphthoyl) acrylic acid.

For the purpose of halogenation I have found that the middle halogens (i. e., bromine and chlorine) are suitable. The halogenation reaction takes place without a catalyst, although the addition of red phosphorus or other catalyst, or the irradiation with ultra-violet light speeds up the reaction in some cases.

The halogenation of the β-(acenaphthoyl) propionic acids can be carried out in any inert solvent. The preferred solvent is acetic acid, but others as, for example, the halogenated hydrocarbon solvents such as chloroform and carbon tetrachloride are suitable. Similarly, other alkanoic acids such as propionic acid are suitable. The dehydrohalogenation is carried out with mildly alkaline reagents, particularly sodium acetate in acetic acid. However, potassium acetate, potassium carbonate, sodium carbonate, calcium carbonate, and alkali metal salts of alkanoic acids are suitable. High-boiling organic bases such as quinoline, pyridine, dimethylaniline and related compounds are also operable. Other solvents than acetic acid may be used for the dehydrohalogenation, as for example, hydrocarbons, halogenated hydrocarbons, and related inert solvents.

The following examples illustrate a preferred embodiment for the operation of my invention. They are provided merely for the purpose of illustration, and in no way limit my invention in spirit or in scope. Quantities of materials are given as parts by weight unless otherwise noted.

Example 1

β-Bromo-β-(5-acenaphthoyl) propionic acid.— A suspension of 164 grams of finely powdered β-(5-acenaphthoyl) propionic acid in 1640 cubic centimeters of glacial acetic acid is stirred vigorously at 60° centigrade while a solution of 102.4 g. of bromine in 330 cc. of glacial acetic acid is added dropwise, the temperature being maintained at 57-63° C. The addition takes approximately 1 hour. At the end of this time, the mixture is heated to 65-70° C. for a few minutes in order to complete the reaction. The mixture is then chilled and stirred for 30 minutes. The acetic acid is removed under reduced pressure, until the volume of solution is 800 cc. This solution is chilled, and the precipitate of β-bromo-β-(5-acenaphthoyl) propionic acid is removed by filtration and dried. The yield of brominated acid from 3 such runs is 471.5 g., and the melting point is 162-163° C. (with decomposition).

Example 2

β-(5-acenaphthoyl) acrylic acid.—25 g. of β-(5-acenaphthoyl) propionic acid and 8 g. of fused anhydrous sodium acetate are dissolved in 80 cc. of glacial acetic acid and refluxed for 30 minutes with stirring. About 80% of the acetic acid is removed under reduced pressure, and 200 cc. of cold water are added to the residue. A precipitate of granular β-(5-acenaphthoyl) acrylic acid is deposited. This is removed by filtration, ground to a thin suspension in cold water, and the suspension is again filtered, rinsed with water, and dried at 65° C. The yield of β-(5-acenaphthoyl) acrylic acid is 20.5 g. of acid melting at about 148° C. After recrystallization with benzene, using decolorizing charcoal, the melting point is raised to 157° C. In order to secure maximum purity, it is advisable to cool the benzene solution to only about 20° C. On cooling to 10° C. a small but significant amount of lower melting product crystallizes out. Recrystallization from acetic acid is preferable. A product melting at 159° C. can be obtained from this solvent.

Example 3

β-(3-acenaphthoyl) acrylic acid can be prepared as follows: 1 part of β-(3-acenaphthoyl)-propionic acid in 10 parts of glacial acetic acid are brominated at about 60° C. according to the method of Example 1, using 1 mole of bromine in 10 volumes of glacial acetic acid. When the addition of bromine is complete, the solution is heated for a few minutes to 70-80° C. Then 0.4 part of fused potassium acetate is added and the mixture is refluxed for 30 minutes. The solution is concentrated under reduced pressure to about one-fifth its volume and diluted with cold water. A precipitate of β-(3-acenaphthoyl)acrylic acid results. This product can be purified by recrystallization from benzene. It melts at 191–192° C.

*Example 4*

β-Bromo-β-(3-acenaphthoyl)propionic acid.—A solution of 384 parts of bromine in 1100 parts of glacial acetic acid is added over a period of 20 minutes to a stirred suspension of 630 parts of β(3-acenaphthoyl)propionic acid in 6300 parts of glacial acetic acid maintained at 58–62° C. The agitation is continued for 25 minutes after the addition is complete and then the solvent is removed by evaporation under reduced pressure. The residue of β-bromo-β-(3-acenaphthoyl)propionic acid rapidly crystallizes. It is suspended in about 800 parts of cold benzene, filtered and then washed with cold benzene. Upon recrystallization from toluene in the presence of decolorizing charcoal β-bromo-β-(3-acenaphthoyl)propionic acid forms yellow crystals melting at 167° C. (with decomposition).

β-(3-acenaphthoyl)acrylic acid.—A suspension of 337 parts of β-bromo-β-(3-acenaphthoyl)propionic acid and 107 parts of fused sodium acetate in 1100 parts of glacial acetic acid is refluxed for 30 minutes, during which time the organic acid goes into solution. About 80% of the acetic acid is removed under vacuum and 2000 parts of water are added to the residual slush of yellow crystals. The mass is granulated by agitation and filtered. The filter cake is washed with water and dried. After recrystallization from ethyl acetate in the presence of activated charcoal, the β-(3-acenaphthoyl)acrylic acid forms bright yellow crystals melting at 192° C.

I claim:

1. The process of preparing a β-(acenaphthoyl)acrylic acid which comprises halogenating a β-(acenaphthoyl)propionic acid, dehydrohalogenating the resulting β-halo-β-(acenaphthoyl)-propionic acid with a mild base, and isolating the β-(acenaphthoyl)acrylic acid.

2. The process of preparing a β-(acenaphthoyl)acrylic acid which comprises brominating a β-(acenaphthoyl)propionic acid, dehydrobrominating the resulting β-bromo-β-(acenaphthoyl)propionic acid with a mild base, and isolating the β-(acenaphthoyl)acrylic acid.

3. The process of preparing β-(5-acenaphthoyl)acrylic acid which comprises brominating β-(5-acenaphthoyl)propionic acid, dehydrobrominating the resulting β-bromo-β-(5-acenaphthoyl)propionic acid with a weak base, and isolating from the reaction mixture the β-(5-acenaphthoyl)acrylic acid.

4. The process of preparing β-(3-acenaphthoyl)acrylic acid which comprises brominating β-(3-acenaphthoyl)propionic acid, dehydrobrominating the resulting β-bromo-β-(3-acenaphthoyl)propionic acid with a weak base, and isolating from the reaction mixture the β-(3-acenaphthoyl)acrylic acid.

5. The process of preparing β-(5-acenaphthoyl)acrylic acid which comprises brominating β-(5-acenaphthoyl)propionic acid in glacial acetic acid, dehydrobrominating the resulting β-bromo-β-(5-acenaphthoyl)propionic acid with sodium acetate in glacial acetic acid, and isolating from the reaction mixture the β-(5-acenaphthoyl)acrylic acid.

6. The process of preparing β-(3-acenaphthoyl)acrylic acid which comprises brominating β-(3-acenaphthoyl)propionic acid in glacial acetic acid, dehydrobrominating the resulting β-bromo-β-(3-acenaphthoyl)propionic acid with sodium acetate in glacial acetic acid, and isolating from the reaction mixture the β-(3-acenaphthoyl)acrylic acid.

ROBERT R. BURTNER.

REFERENCES CITED

The following references are of record in the file of this patent:

UNITED STATES PATENTS

| Number | Name | Date |
|---|---|---|
| 2,087,466 | Bauer et al. | Dec. 20, 1937 |

OTHER REFERENCES

Fieser et al., J. Am. Chem. Soc., vol. 61, pp. 1272–1281 (1938).

Fieser et al., J. Am. Chem. Soc., vol. 54, pp. 4347–4356 (1932).